Patented July 13, 1943

2,324,066

UNITED STATES PATENT OFFICE 2,324,066

PURIFICATION OF HYDROCARBON OILS

Gerald C. Connolly, Baton Rouge, La., assignor to Standard Oil Development Company, a corporation of Delaware No Drawing. Application August 3, 1940,
Serial No. 351,247

5 Claims. (Cl. 196—28)

This invention relates to the purification of hydrocarbon oils and pertains more particularly to catalysts for desulfurizing said oils.

The object of the present invention is to provide an improved catalyst capable of desulfurizing hydrocarbon oils.

Other objects and advantages will be apparent from the more detailed description hereinafter.

It has been found that catalysts prepared by combining vanadium oxide with a hydrous oxide of silica or a hydrous oxide of silica containing alumina form highly effective catalysts for bringing about the removal of sulfur impurities from hydrocarbon oils and hydrocarbon gases.

The term "hydrous oxide" of silica as herein employed is intended to mean an oxide of silica containing a large volume of water imbibed within the structure of the oxide which is not chemically combined or in solution within the oxide. The water so imbibed is characterized by the fact that it can be removed by a low temperature drying treatment or by the fact that it can be frozen without natural reduction in the freezing point of the water. It will, therefore, be understood that the term "hydrous oxide" of silica is not intended to be an anonym of anhydrous oxide of silica. This term includes, for example, materials commonly known as silica hydrosol, silica hydrogel, wet gelatinous precipitates of silica, and, in the case of the silica-alumina compounds, plural gels of silica and alumina, plural hydrosols of silica and alumina, mixed hydrogels of silica with alumina, the latter being in the hydrous or non-hydrous form.

The amount of vanadium oxide incorporated in the catalyst may vary over an extended range and still retain some of the benefits of the invention. For most effective results, however, the amount of vanadium oxide should be between about 2 and 20% and particularly between 5 and 10%.

The vanadium oxide may be incorporated into the hydrous oxide in any suitable manner, such as by soaking the hydrous oxide in a solution containing a decomposable salt of vanadium, such as ammonium vanadate, or by mixing or homogenizing the hydrous oxide directly with vanadium oxide. The vanadium oxide may be in the form of a vanadium gel, either in dry or wet state.

After incorporating the vanadium oxide into the hydrous oxide, the resulting product is then dried at low temperatures and thereafter activated by slowly heating to a temperature of about 800° F. and maintaining such temperature for an extended period, such as three hours.

One particularly effective catalyst for removing sulfur from hydrocarbon oils and gases is prepared from silica, alumina and vanadium, in which the silica hydrogel is co-impregnated with a solution containing a mixture of ammonium vanadate and aluminum nitrate of such relative proportions as to form a catalyst containing between about 12 and 15% of alumina and about 5% of vanadium oxide.

Another highly active catalyst for desulfurizing hydrocarbon oils and gases is obtained by impregnating silica hydrogel with a solution of ammonium vanadate without the addition of alumina.

In the above cases, the most effective of the desulfurizing catalysts is formed when the silica hydrogel is capable of producing a dry gel having an apparent density between about 0.50 and 0.70, and particularly 0.60. The relative density of the silica gel formed from the hydrogel may be modified during the course of preparation in various ways according to procedure well known in the art. For example, the density of the gel may be modified by the temperature of the washing treatment of the hydrogel with ammonium hydroxide and the like.

To illustrate the advantages of the invention, the following examples are submitted, it being understood that the values and conditions given therein are illustrative rather than limitive.

In each of the examples the desulfurizing activity of catalysts, silica hydrogel, silica hydrogel incorporated with vanadium oxide, and silica hydrogel incorporated with aluminum oxide and vanadium oxide was determined by passing a Venezuelan heavy cracked naphtha known as "Aruba splitter-bottoms" having a sulfur content of 0.275% over the catalyst to be tested at a rate of 1 volume of liquid feed per volume of catalyst per hour over a six-hour period. In some runs a temperature of 800° F. and in others a temperature of 900° F. was maintained. Samples were taken in most cases at the end of the first, fourth and sixth hour periods of the operating run and sulfur determinations made on the samples.

*Example 1*

For comparative purposes, a commercial grade of bauxite originating from the State of Alabama was first tested under the above set of conditions and the results of such tests are summarized in the table hereinafter.

Example 2

A silica hydrogel was first formed according to conventional procedure. Briefly, this procedure consists in reacting sodium silicate with an acid such as sulfuric acid under controlled conditions, such as by combining the two reagents confluently or by the addition of the sodium silicate solution to the acid solution. When the concentration of the two solutions is properly controlled and the materials combined as described, a clear solution normally results which upon standing sets into a solid hydrogel containing the water solution imbibed therein. This product is broken into lumps and washed free of soluble reaction products. The resulting material constitutes the silica hydrogel employed in the preparation of the catalyst.

This washed hydrogel was then soaked in a solution of ammonium vanadate having a strength sufficient to deposit about 10% of vanadium oxide on the silica hydrogel. The soaking was continued until the hydrogel was thoroughly saturated. After this the product was slowly dried at a temperature below 212° F. and thereafter slowly heated to 800° F. to decompose the ammonium vanadate into vanadium oxide and to activate the catalyst. This product in molded condition was subjected to the test conditions previously described and the results of such tests are tabulated in the table hereinafter.

Example 3

A washed silica hydrogel as described in Example 2 was soaked in a mixed solution of aluminum nitrate and ammonium vanadate of relative proportions such as to form a catalyst containing from 12 to 15% of alumina and about 5% of vanadium oxide. This product was then slowly dried, activated and tested as previously set forth. The results of these tests are shown in the following table:

| Ex. | Catalyst | Sulfur analysis | | | | | |
|---|---|---|---|---|---|---|---|
| | | Run I—800° F. | | | Run II—900° F. | | |
| | | 1 hr. | 4 hrs. | 6 hrs. | 1 hr. | 4 hrs. | 6 hrs. |
| 1 | Bauxite | 0.208 | 0.218 | 0.22 | 0.177 | 0.197 | 0.219 |
| 2 | Silica hydrogel 10% $V_2O_5$. | 0.200 | 0.189 | 0.150 | 0.090 | 0.212 | 0.202 |
| 3 | Silica hydrogel 12-15% $Al_2O_3$, 5% $V_2O_5$. | 0.108 | 0.135 | 0.146 | 0.104 | 0.154 | 0.194 |

It will be noted from the above table that the catalyst constituting the present invention forms a much more effective catalyst than bauxite which has heretofore been recognized as being an active desulfurizing catalyst.

Having described the preferred embodiment of the invention, it will be understood that it embraces such other variations and modifications as come within the spirit and scope thereof.

I claim:

1. A method of desulfurizing hydrocarbons which comprises subjecting said hydrocarbons to the action of a catalyst comprising silica and vanadium oxide formed by combining the vanadium oxide with the hydrous oxide of silica and thereafter drying the resulting product, and continuing the treatment of said hydrocarbon with said catalyst at a temperature and for a period sufficient to remove a substantial amount of sulfur therefrom.

2. A method of removing sulfur from hydrocarbons which comprises contacting such hydrocarbons with a catalyst comprising silica, alumina and vanadium oxide formed by impregnating a hydrous oxide of silica with a solution containing a decomposable salt of vanadium and a solution containing a decomposable salt of aluminum, drying the resulting product and decomposing such salts to the oxides, and maintaining said hydrocarbons in contact with said catalyst for a period sufficient to remove a substantial amount of sulfur therefrom.

3. A method of desulfurizing hydrocarbons which comprises subjecting a sulfur containing petroleum oil to the action of a catalyst comprising silica and vanadium oxide formed by impregnating a "hydrous oxide" of silica with a solution containing a decomposable salt of vanadium and thereafter drying the resulting product and heating it to decompose the vanadium salt and to activate the catalyst, and continuing the treatment of said oil with said catalyst at a temperature and for a period sufficient to remove a substantial amount of sulfur therefrom.

4. A method of resulfurizing hydrocarbons which comprises passing a sulfur containing oil at a temperature of about 800 to 900° F. for a period of at least several hours over a catalyst prepared by impregnating a "hydrous oxide" of silica with a solution of ammonium vanadate, then drying the impregnated silica at a temperature below 212° F. and thereafter heating the dried product to about 800° F. to decompose the ammonium vanadate and to activate the catalyst, said catalyst containing between 2 and 20% of vanadium oxide.

5. A method of desulfurizing hydrocarbons which comprises passing a sulfur containing oil at a temperature of about 800 to 900° F. of a period of at least several hours over a desulfurizing catalyst prepared by impregnating a "hydrous oxide" of silica with a solution containing ammonium vanadate and aluminum nitrate in sufficient proportions to form a catalyst containing from 12 to 15% of alumina and about 5 to 10% of vanadium oxide and slowly drying the impregnated product at a temperature below 212° F., then slowly heating the dried product to about 800° F. to decompose the impregnated salts and to activate the catalyst.

GERALD C. CONNOLLY.